Jan. 26, 1960 H. S. DOMBROWSKI ET AL 2,922,710
PRODUCTION OF REFRACTORY METALS
Filed Feb. 19, 1957 3 Sheets-Sheet 1

INVENTOR
HENRY S. DOMBROWSKI
CHARLES H. WINTER, JR.

BY *Francis J. Crowley*
ATTORNEY

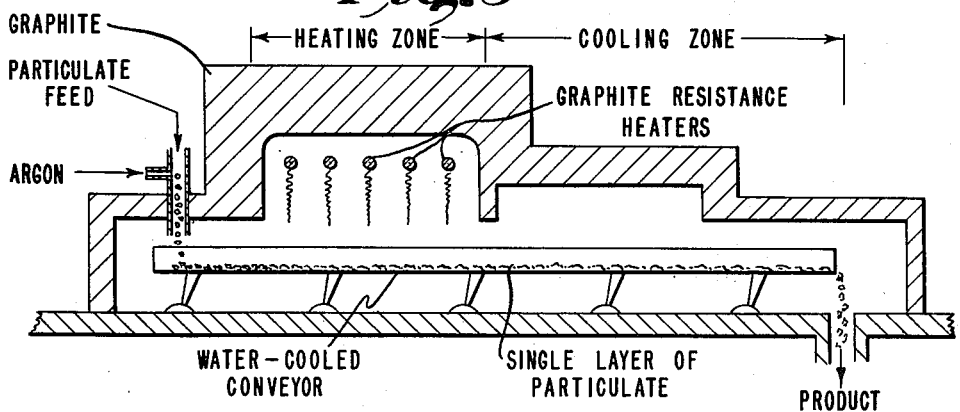
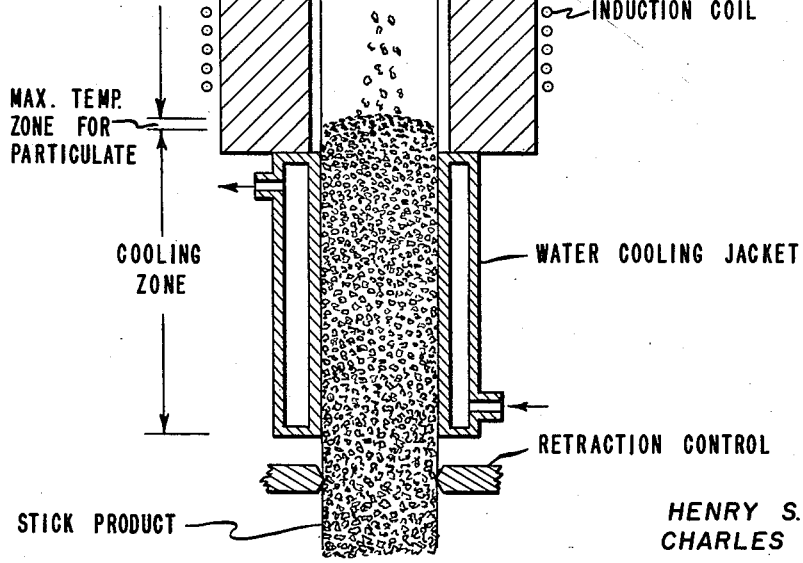

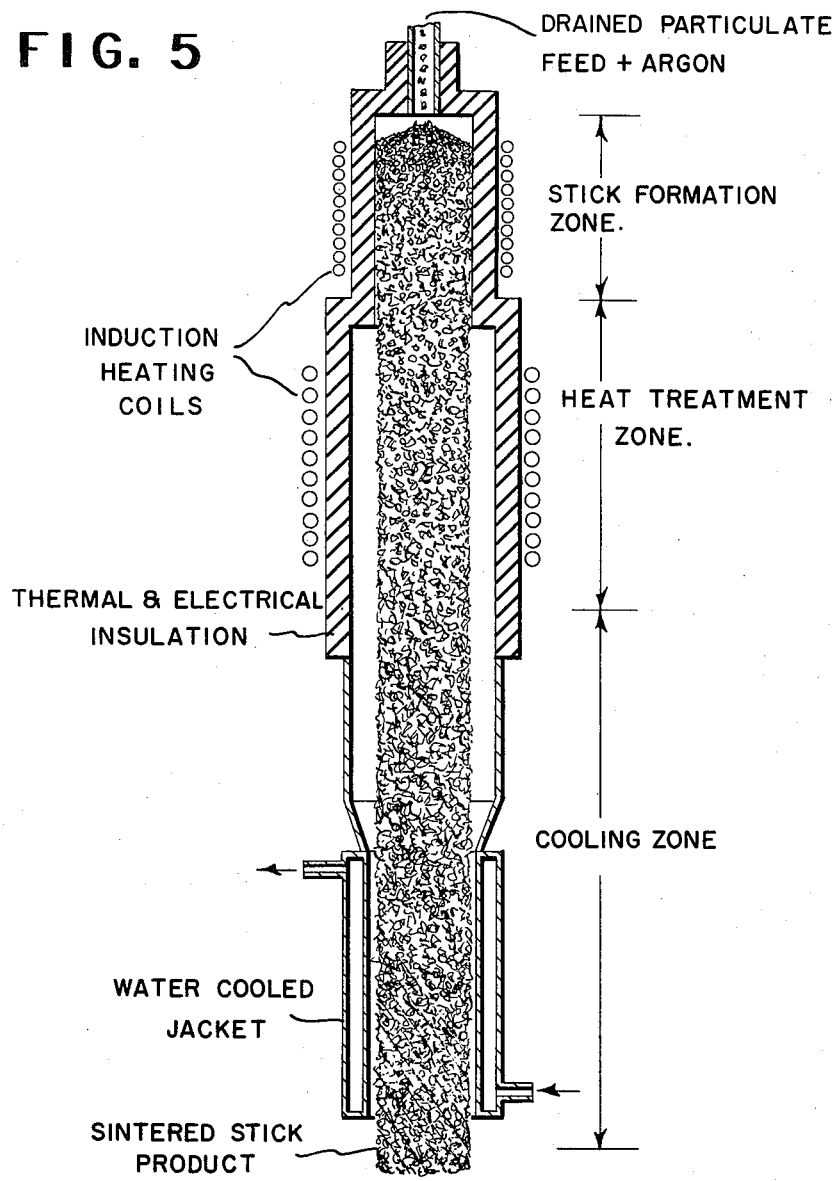

United States Patent Office 2,922,710
Patented Jan. 26, 1960

2,922,710

PRODUCTION OF REFRACTORY METALS

Henry S. Dombrowski and Charles H. Winter, Jr., Wilmington, Del., assignors to E. I. du Pont de Nemours and Company, Wilmington, Del., a corporation of Delaware Application February 19, 1957, Serial No. 641,143

9 Claims. (Cl. 75—84)

This invention pertains to an improvement in the manufacture of pure refractory metals of the fourth and fifth groups of the periodic table. This application is a continuation-in-part of our application Ser. No. 539,722, filed October 11, 1955, now abandoned.

One of the most widely used commercial processes for the production of these metals is by the reduction of the metal halide. Various reducing agents have been used with major emphasis being placed on magnesium and sodium metals. In this process, the halide of the reducing metal is formed, and the refractory metal is obtained as a sponge which is essentially an interlocked mass of crystals of fairly small size. The crude reaction mixture will contain, besides the refractory metal, by-product salts, excess reductant metals and the halide of the metal produced. The major portion of these products can be removed from the refractory metal by conventional separation processes, such as draining or screening, but further treatment is necessary in order to obtain a commercially satisfactory product. In the case of commercial titanium, the purity of the metal has lately been improved so that ductility is advantageously increased. The ductility or softness of good titanium is indicated by a low Brinell hardness number; i.e., a hardness well below 150 B.H.N. It is now very desirable to produce the metal with a B.H.N. of not more than 100. One of the methods for removing the residual by-products to produce a ductile refractory metal is by vacuum distillation. An example of the process is disclosed in U.S. Patent 2,663,634. Another method is to leach out the by-products, etc. with an aqueous medium, e.g., a dilute acid solution. However, this procedure has objectionable limitations. The metal becomes contaminated with oxygen, nitrogen and hydrogen during contact with the aqueous leaching medium, and these impurities cause the metal to become hard and non-ductile. In the past, heating the reaction mixture has been advocated to reduce chemical reactivity of such metals. While this procedure would prevent contamination during leaching, there has been the problem of introducing further contaminants during the heating step. For instance, when heat is applied through a containing iron vessel, there is contamination of titanium at a temperature of 1050° C. This is because a titanium-iron eutectic alloy, which melts at this temperature, is formed at the area of contact between the titanium and the containing crucible.

It has now been found that by heating particles of a crude, drained refractory metal sponge, by the direct application of energy to the metal, to at least the boiling point of the by-product salt and below the melting point of the metal for a short period of time not exceeding 10 minutes, the surface area of the metal is thereby reduced so as to permit aqueous leaching without contamination. For instance, in the case of titanium, the surface area has been reduced to less than .05 square meter per gram and in the case of niobium to less than 0.1 square meter per gram, and said metal sponges with this low surface area can be leached by conventional methods without encountering undesirable contamination either in the leaching or the heating step. (Surface area determinations are discussed by Emmett in "Ind. Eng. Chem.," vol. 37, p. 639, 1945.) It has also been found that sponge treated in this manner is characterized by a minimum of particle-to-particle sintering so that it is unnecessary to use heavy crushing means prior to the leaching process. Any particle-to-particle bonding which occurs as a result of the present process is only a slight interconnecting by thin bridges of titanium at the point of contact of the particles. Such bonding may be broken with little difficulty.

Therefore, it is an object of this invention to provide a novel process for treating a crude refractory metal obtained from the reduction of its halide so that the metal may be satisfactorily recovered from reaction by-products by leaching in an aqueous medium. Another object is to provide means of conditioning the crude refractory metal sponge so that it may be leached in aqueous solutions without deleteriously affecting its inherent ductility. A still further object of this invention is to provide a faster process for preparing said metal for leaching with a minimum of particle-to-particle sintering.

These and other objects of the invention are accomplished by an improvement in the process of producing a refractory metal involving the chemical reduction of an anfluoridous halide of said refractory metal, such as titanium tetrachloride with a metal reductant selected from the group consisting of sodium and magnesium, followed by draining of molten by-product salt and aqueous leaching to remove insoluble materials. The improvement comprises, prior to leaching, heating the drained, crude metal in particulate form, in an inert atmosphere, at least to the boiling point of the by-product salt and below the melting point of the refractory metal for a period of from about one to ten minutes. The heating is done out of contact with hot conductive-heating surfaces, such as a heated container, by the use of either radiant heating, resistance heating, or inductive heating methods which directly heat the metal rather than some other surface which would in turn transfer the heat to the metal.

In preferred embodiments, the refractory metals are titanium and niobium obtained by the reduction of their corresponding halides.

For purposes of convenience in describing this invention, the term "crude refractory metal product" is used to describe the metal which is separated from the other materials of the reaction by draining off the latter while they are still in the molten state. However, as previously mentioned, complete separation cannot be obtained by draining, and the remaining crude metal product consists essentially of sponge metal with minor amounts of by-product salts and residual reactants.

In the process of this invention, the time-temperature relationship must be adjusted so that the heating is stopped as quickly as possible after it is sufficient to reduce the surface area to the desired minimum. The time period, of course, will vary depending upon the temperature and apparatus used; however, it has been found that a period of from 1-10 minutes is usually a sufficient time when operating within the temperature limits of the invention.

An atmosphere which is inert to the refractory metal is used in the process when the metal is at elevated temperatures. This inert atmosphere is a safeguard against contamination which might result if the process were carried out in air. Inert gases, such as argon or helium are suitable as well as the vapors of the by-product salts of the reduction reaction.

The leaching process which removes the by-products of the reduction reaction from the sponge metal involves simply contacting the crude reduction product with an aqueous solvent for the by-product until the soluble substances are removed. Water could be used as the aqueous solvent, but it is better to have the solvent slightly acid. For example, the preferred aqueous leaching medium is a 5% nitric acid solution. For a discussion of a conventional leaching process, reference is made to the "Bureau of Mines Report of Investigations, 4519," pages 16 and 17.

Referring to the accompanying drawings, there are shown various apparatus and methods for carrying out the invention.

Figures 3 and 4 are cross-sectional diagrammatic views of apparatus wherein the crude product is heated by thermal radiation.

Figure 5 is a cross-sectional diagrammatic view of an apparatus wherein the crude product is heated by induction.

Figure 1:
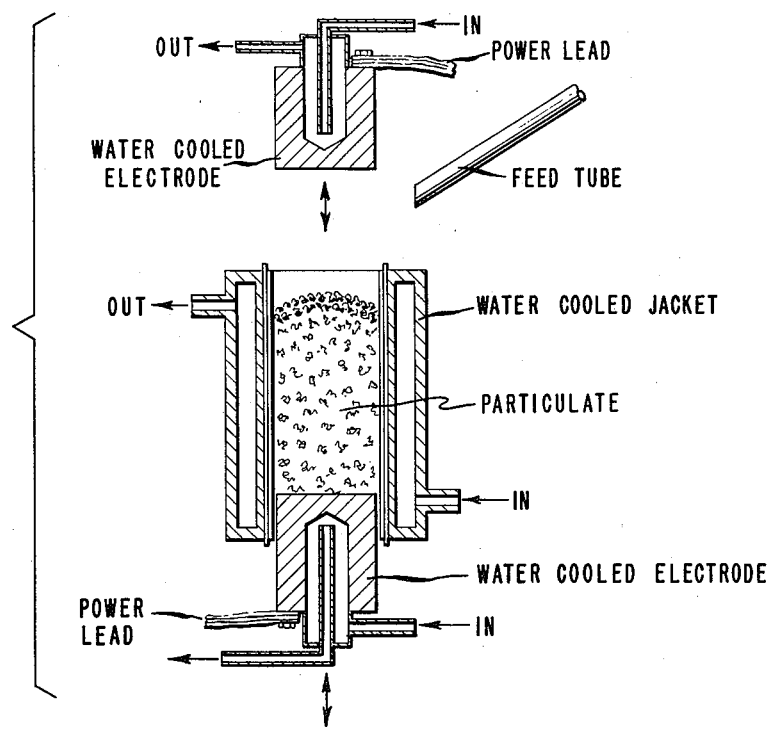
Figures 1 and 2 are cross-sectional diagrammatic views of apparatus wherein the crude product is heated by means of electrical resistance.
Figure 2:
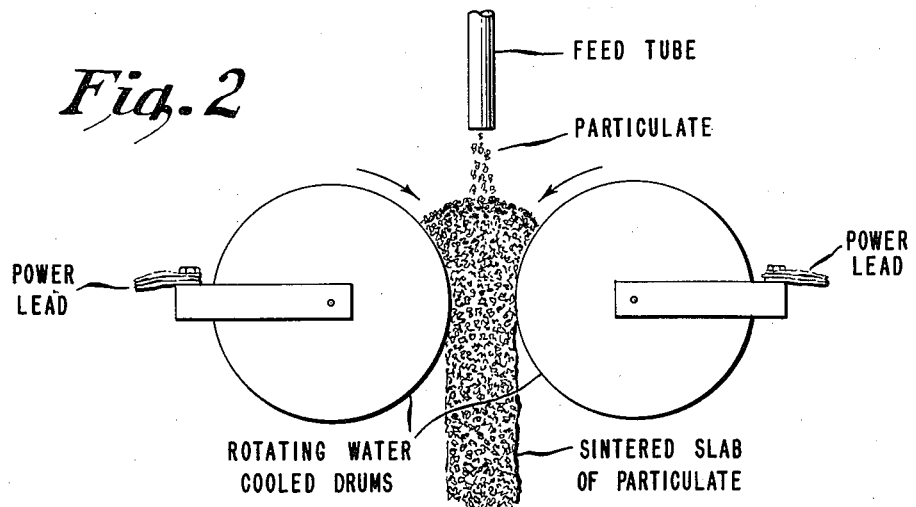

Figures 1 and 2 show suitable apparatus for methods of operation which utilize the heating effect obtained by the direct passage of electrical current through a bed of particles of metal sponge. The heat generated is proportional to $I^2R$, where I is the current and R is the resistance of the bed of particulate in the direction of current flow. Drained, cooled and crushed lumps of particulate sponge are easily poured or formed into a suitable shape for use as a resistor. The total electrical resistance of this material may be broken down into two parts: (a) resistance of the metal reduction product (this varies somewhat, depending upon the content of metal, salt and residual reactants), and (b) contact resistance between particles. Contact resistance is by far the greater of the two, and it makes this method of heating particularly well adapted to produce the high temperature required. The temperature to which a given bed of metal may be heated depends upon current flow and the rate of heat loss from the bed. In many cases, it may be desirable to water-cool the electrodes and the bed retaining walls to prevent deterioration by the metal and the accompanying contamination of the latter. However, even with such cooling, the desired temperature may be reached, and the total electrical power required by this method is quite moderate owing to its efficient power-to-heat conversion when thus directly applied and its simplicity of form. Any temperature short of the melting point of the refractory metal can be obtained provided the required electrical power is applied.

In Figure 1, a charge of drained particles is fed into the heating chamber from the feed tube. The interior of the chamber has an atmosphere of argon or other inert gas which will protect the metal from atmospheric contamination. The inside of the chamber has a tungsten liner which is surrounded by mica insulation and the external walls are adapted for internal cooling by the circulation of water. The charge may then be submitted to slight compaction either by vibration or by pressing on one or both of the electrodes. Slight compaction is advantageous to reduce the starting resistance of the bed to a value low enough to permit rapid heating when the required voltage is applied. The electrical supply may also be adapted with means to apply a higher voltage for starting the current flow and then applying a lower heating voltage. The metal particles heat to temperature rather rapidly because the resistance of the bed decreases markedly with increasing temperature. The time required to reach the desired temperature will depend upon the power source, the size of the charge, and the heat loss. The total time the bed is held at temperature depends upon several factors including the following: (a) the temperature utilized, (b) the surface area of the material to be treated, and (c) the extent of salt vaporization. It has been found that about ten minutes at temperature is usually sufficient to reduce the surface areas to sufficiently low values (about 0.1 square meter or less per gram) wherein nondegrading leaching is possible. Following the heating portion of the process the bed is allowed to cool before being removed from the argon shielding system. After being cooled down to room temperature and removed from the heating zone, the particles are then separated by light crushing and leached with dilute aqueous acid, preferably an oxidizing acid such as nitric acid, to remove the residual salt by-products.

Figure 2 illustrates a semi-continuous cylindrical roll unit in which the particulate is treated between drum electrodes. This concept involves the heating of the particulate as it passes between two slowly rotating, water-cooled cylindrical electrodes. The bed of particulate is self-forming since the lumps fall on and adhere to the top surface of the hot particulate entering the rolls. The feed is adjusted to avoid spillage over the edges of the bed. The surface of the rollers can be knurled or otherwise roughened to provide a "bite" on the particulate thereby aiding its downward movement. Spacing between the rolls is adjustable and will depend to some extent on the particulate particle size, and the resistance desired between the rolls. For starting, it has been found convenient to hold a bed of particulate between the rolls while closing them together to lower the electrical resistance. Once conduction is started, it is then only necessary to maintain the required feed rate and proper feed distribution across the rolls. The reduced surface area product leaves the rolls as a flat slab which is easily crushed and finished by leaching with an aqueous oxidizing acid such as a 5% nitric acid solution.

Figures 3 and 4 illustrate methods wherein the particulate metal is exposed continuously and uniformly to a high intensity radiant heat flux. After a controlled exposure time, the treated metal particles are removed from the radiant flux field, cooled to room temperature, broken up if necessary into a smaller particle size, and subsequently leached in an aqueous leaching medium. These methods are adapted to apply the radiant heat to a single layer of the particulate at a given time.

Figure 3 represents a continuous layer of crude metal, one particle deep, moving under the source of radiant heat on a water-cooled, vibrating pan. The product emerges as particles or groups of particles which require a minimum of comminuting preparatory to leaching.

In Figure 4, the particulate feed is allowed to fall on and cover over the surface of hot particles which are being exposed to radiant heat. At the high temperatures involved a loose particle-to-particle bonding occurs, and a stick product results. Light-duty comminuting apparatus may be used to reduce the stick product to a form more suitable for leaching.

The embodiment shown in Figure 5 produces a continuous, loosely held stick of particulate metal, utilizing a feed material consisting of drained particulate of relatively high surface area and salt content (e.g., about 0.5 lb. of salt per lb. of Ti). The particulate is first heated in a confined space (shown as the stick formation zone in Figure 5) to a maximum temperature of about 900° C. This temperature is considered high enough to form a coherent stick, yet sufficiently low to prevent both excessive loss of salt by drainage and vaporization, and the interaction of particulate with the walls of the equipment. The stick product is then fed into a high-termperature heat-treatment zone (shown as the heat-treatment zone in Fig. 5) at a continuous controllable rate which allows sufficient residence time to reduce the metal to the desired surface area. Some loss of salt by drainage and vaporization is obtained; however, the major portion leaves with the stick as it passes out of the apparatus. The heat-treatment zone is slightly larger than the stick formation zone. This design keeps the stick out of contact with the walls of the high-temperature zone, thereby minimizing sticking and product contamination. The heating of both zones is accomplished by induction coils. After emerging from the heating zone, the stick passes through a cooling zone (see Fig. 5). The first portion of the cooling zone is larger than the stick to prevent contact with the wall. In the lower portion of the cooling zone, the wall is closer to the stick, and this portion of the wall may be water-cooled to facilitate cooling of the stick. The end product obtained possesses a surface area which is low enough to permit removal of residual salts, etc. by leaching. Since this stick product is relatively loosely bound it is possible to crush it with little difficulty.

The apparatus and process of Figure 5 is an embodiment of the invention which makes use of induction heating. When the drained reduction product which is composed mainly of sponge metal is placed in an electromagnetic field of the proper frequency, the metal will quickly heat to the treatment temperature. This method of heating is very convenient when treating a stick product since it permits penetration of energy into the center of the stick.

Another embodiment using the product from the stick formation zone shown in Figure 5 consists of heating the rod of particles of titanium sponge containing a variable amount of residual salts and reactants by passing it between two electrical contacts thus allowing a heavy electrical current to pass through the rod. The power input and rate of travel past the contacts is adjusted so as to heat the rod to treating temperature. This embodiment produces a high quality, low salt, low surface area stick product which can be marketed as a consumable electrode or broken into a high quality sponge product suitable for leaching.

The following examples are to illustrate specific embodiments of the invention, but they are not meant to be in limitation thereof:

*Example I*

The apparatus shown in Figure 1 was utilized to heat-treat particles of titanium sponge. The drained metal reduction product, obtained by the methods described in U.S. Patent 2,205,854, contained about 30% by-product salt and residual reactants, and ranged in particle size from 12 to 20 mesh. The product was treated in three ways, first a sample was purified by vacuum distillation and melted into a button having a Brinell hardness No. of 120, and an oxygen content of 0.09%. (Oxygen determinations are discussed by Yeaton in "Vacuum," vol. 2, page 115, 1952, and also by Walter in "Ind. Eng. Chem.," vol. 42, page 297, 1950.) A second sample of this product was purified by leaching with an aqueous acid and was found to have a specific surface area of 0.22 square meter per gram, and an oxygen content of 0.20%. A sample was melted into a test button having a Brinell hardness No. of 180.

A third sample of this product was heat-treated using the method of this invention and the apparatus illustrated in Figure 1. A charge of metal particles was placed in the cylindrical chamber forming a bed about ¾ inch in diameter by 7 inches high. The heating chamber was closed by the upper and lower electrodes, and a flow of argon gas was utilized to purge the heating space of air. A slight downward pressure was applied to the upper electrode to obtain some compaction of the bed and permit easier flow of the electrical current. A starting potential of about 80 volts was applied, but this was decreased rapidly to an operating potential of 7 volts between the electrodes with about 400 amps. of current flow. After a period of about 2 minutes, the temperature of the metal charge was about 1420° C. This temperature was held for about 3 minutes. Considerable drainage of molten salt from the bed was noticed, particularly as higher bed temperatures were reached. After the completion of the heating cycle the electrical current flow was discontinued, and the charge was allowed to cool in the argon atmosphere. After cooling the bottom electrode was removed, and the charge was removed from the heating chamber. The partially sintered mass was easily crushed with a hammer and the material leached in aqueous 5% nitric acid. After leaching, the metal was dried at less than 100° C. and showed a specific surface area of .04 square meter per gram, and an oxygen content of .075%. A test button was melted which had a Brinell hardness No. of 100. A comparison of the results between the three samples illustrates that a considerable improvement was obtained by the method of this invention. The quality of the heat-treated, leached product is appreciably better than that of the leached sponge material and essentially equal to the vacuum purified sponge.

*Example II*

The particulate titanium metal reduction product utilized in this example was obtained by reacting metered amounts of sodium metal and titanium tetrachloride at a temperature between about 800° C.–1000° C. to obtain a molten salt product containing sodium chloride and titanium subchlorides, the titanium subchloride having a chlorine-to-titanium ratio of about 2.6 to 1. The titanium subchlorides in this molten salt were reacted with particles of magnesium metal, of about ⅛" in size, in an agitated reactor at a temperaturue of about 800° C. to obtain a particulate titanium metal product and a by-product of magnesium chloride and sodium chloride as molten salts. The major portion of the molten salts was drained from the particulate metal product. A portion of this product was purified by leaching with 5% aqueous solution of nitric acid, then washed with water until the wash water was substantially free of soluble chlorides, and was found to have a specific surface area of 0.35 square meter per gram, and an oxygen content of 0.27%. A sample button of this leached product had a Brinell hardness No. of 200.

A second portion of the particulate metal product was treated by a specific embodiment of this invention using equipment similar to that of Figure 4. The heat source, as shown, consists of a thick walled graphite pipe thermally insulated from the induction coil by carbon black. The top end of the pipe is fitted with a thick graphite plate through which enters the particulate feed tube. The feed which enters through this tube has been purged with argon. The bottom end of the graphite pipe opens to a water-cooled metal jacket which cools the product prior to removal from the unit. A graphite plate is initially placed within the reactor just below the top of the water-cooling jacket to retain the metal within the bottom of the heating chamber. This plate is gradually retracted as the heat-treated material is built up within the unit. When the plate is removed, a pair of retractable clamping jaws are provided to lower the rod product at a constant rate in order to maintain the desired top surface level within the heating chamber. The stick product is broken off periodically and crushed to particulate size for leaching. The particulate metal reduction product fed to the heating zone was about ¼" in size and contained about .5 lb. of salt per pound of titanium. The graphite pipe of the heating chamber had a 12" inside diameter and one inch thick walls, and it was 30" in length. The graphite plate on top of the pipe was 3 inches thick. This system was surrounded with 4" of carbon black insulation held within a silica vessel. The graphite feed tube through which the particulate and argon entered had a 2" inside diameter with a ⅜" wall, and it was 36" long. This tube was surrounded by 6" of carbon black insulation. An induction coil 24" inside diameter by 24" high was placed around the silica vessel; the center of the heating coil being located at about the bottom of the 3" graphite top plate. The cooling jacket was a metal tube 12" inside diameter by 30 ft. in length.

The heat-treatment operation was started by placing a retractable plate at the top of the water-cooled section. A layer of argon purged particulate metal several inches thick was then dropped on the plate. Electrical power was then applied to the induction coil, and the roof and walls of the graphite heater began to heat. When the roof and adjacent wall areas were at about 1900° C., the feed of particulate metal reduction product was started to the unit at a rate of about 100 lbs. per hour. The retraction of the supporting plate was then begun, and the feed and retraction was stabilized at a rate of about 1 ton of metal per day. Temperature of particles as measured by an optical pyrometer was about 1500° C.–1550° C. The addition was continued until heat-treated metal emerged from the cooling zone. A sample of this product was obtained and it was easily broken up by a hammer into lumps which were about the same size as the starting material. These were leached with an aqueous 5% solution of nitric acid. After leaching and washing until the rinse water was substantially chloride-free, the product was dried at a temperature of less than 100° C. A sample of the leached, washed product was found to have a specific surface area of 0.03 square meter per gram, and an oxygen content of 0.07%. A portion was then arc melted into a test button, which had a Brinell hardness No. of 95. These results represent a considerable improvement over the sample which was not treated by the process of this example.

Example III

The apparatus and method illustrated in Figure 5 was used to heat-treat a particulate metal product obtained by the magnesium reduction of a titanium subchloride in molten sodium chloride as described in Example II. The heat-treating apparatus shown in Figure 5 comprised a 4" diameter silica tube in the stick formation zone, and a 6" diameter silica tube in the heat-treatment zone. The apparatus was purged with argon, and a starting platform of fused silica held on a silica rod was thrust upwardly into the bottom of the stick formation zone to hold the stick to be formed. Particulate and argon were fed from a hopper into the stick formation zone and electrical energy was supplied to the induction coils. Temperatures of the heating zones were measured by optical pyrometer sightings through the walls of the silica tubes. The heating means were regulated to obtain a temperature of about 1500° C. in the heat-treatment zone and the silica platform was withdrawn at a rate which gave a retention time of about 8 minutes in this zone. This rate gives a throughput of about 40 lbs. of titanium per hour. The loosely formed stick of the heat-treated metal product was broken up and leached in a 5% aqueous solution of nitric acid, and washed until the wash liquor was substantially free of chloride. It was then dried in an oven at a temperature below 100° C. A sample from the heat-treated batch was melted in an arc furnace, and it had a Brinnel hardness number of 100 and .08% oxygen. A leached sample which was not treated by this process had a B.H.N. of 200 and contained .30% $O_2$. The latter is an unsatisfactory metal product.

Example IV

Niobium metal was prepared by reacting molten magnesium with $NbCl_5$ in an argon purged iron reaction vessel. The temperature of the reactor walls was controlled and not allowed to exceed about 1000° C. A major part of the by-product $MgCl_2$ was drained out of the reactor and the crude metal cooled to room temperature under argon. The porous metal mass was removed and milled into small lumps ⅛ to ¼ inch in diameter. A first portion of this was leached with 5% nitric acid, washed and dried. It was found to have a specific surface of 0.25 square meter per gram and 0.18% oxygen. A representative test button was prepared by arc melting under argon and it exhibited a Brinell hardness number of 205. A second representative portion of the crude milled sponge was spread out under a radiant heat source as shown in Figure 3. The heat source temperature was about 2000° C.–2200° C. The metal particles were caused to vibrate and turn under the heat on the cooled surface. Observation with an optical pyrometer indicated that a temperature of about 1600° C.–1650° C. was reached for roughly 3 minutes before allowing the charge to cool. The cooled product was then leached by the same procedure as used on the first portion to remove salt which was prevented from evaporating off because of condensation in the lower cool side of the particles. The leached dried metal was tested as before and showed: a surface area of about 0.07 square meter per gram, 0.05% oxygen, and after melting a Brinell hardness number of 80.

While specific embodiments of the invention illustrate the treatment of titanium and niobium metals, other group IV and group V refractory metals, such as zirconium, hafnium, vanadium and tantalum may be similarly treated. The metal reduction product to be heat-treated should have an average particle size which is preferably less than ½" and greater than 100 mesh. If the heat-treatment process causes particle-to-particle bonding, light crushing is used to reduce the material to a size which is in the above range. Although it is economically preferable to treat the metal reduction product after a simple, partial separation such as draining, the invention may also be utilized to treat material which has been preliminarily subjected to a rough vacuum distillation. It is preferred to heat-treat metal reduction products containing not more than 3 parts by weight of by-product salts to 1 part by weight of product metal, and a range of less than 1 part by weight of by-product salts to 1 part of product metal has even greater preference. With a higher salt content in the reduction product, it may be necessary to provide salt channels to allow the exuded salt to be removed from the heat-treatment chamber during the heating operation.

The by-product salts involved in this invention include sodium chloride, sodium bromide, sodium iodide, magnesium chloride, magnesium bromide and magnesium iodide. These by-product salts are derived from the anfluoridous halides (the halides excepting fluorides) of the refractory metals during the reduction with sodium or magnesium. Of these anfluoridous refractory metal halides, the normal valent chlorides, as well as subchlorides, are preferred. The subchlorides are preferably in molten salt solution, such as molten sodium chloride, as shown in Example II.

It has been shown that electrical resistance, thermal radiation, and induction heating are easily adaptable to the method of the invention.

As shown by the examples, this invention is beneficial in obtaining a metal product which lends itself admirably to the aqueous leaching step, and this combination produces a purified metal product substantially equivalent to that obtained by the more expensive and tedious process of vacuum distillation. This invention has certain advantages and attains results not obtainable by other known heating steps. For example, it has been proposed that the metal sponge, produced by reducing titanium tetrachloride with magnesium, be heated for several hours in the iron reaction vessel at 800° C.–900° C. to reduce the fineness. It has been found, however, that the specific surface of this product cannot be reduced below about .07 square meter per gram even on heating many hours at 1000° C. This material will then pick up enough contamination on leaching to have a Brinell hardness number in excess of 100. Since it is impossible to heat titanium in contact with iron at temperatures above about 1000° C. without bad contamination, a specific surface of less than .07 square meter per gram is not obtainable by prior art methods. The more rapid higher temperature treatment of this invention makes possible the preservation of inherent ductility of the crude product during the desired leaching step and results in titanium with Brinell hardness numbers in the 80 to 120 range.

We claim:

1. In the production of a refractory metal of groups IV and V of the periodic table involving the chemical reduction of a halide of said refractory metal selected from the group consisting of the chlorides, bromides, and iodides with a reducing metal selected from the group consisting of sodium and magnesium, followed by draining of molten by-product salt and aqueous leaching to remove residual soluble material the improvement which comprises, prior to leaching, heating the drained, crude metal in particulate form at least to the boiling point of the by-product salt and below the melting point of the refractory metal for a period of from about 1–10 minutes in an inert atmosphere and out of contact with hot conductive-heating surfaces and then cooling said metal.

2. The process of claim 1 in which the refractory metal is titanium.

3. The process of claim 2 in which the refractory metal halide is a titanium chloride.

4. The process of claim 1 in which the refractory metal is niobium.

5. The process of claim 4 in which the refractory metal halide is a niobium chloride.

6. In the production of titanium metal involving a chemical reduction of a titanium chloride with a reducing metal selected from the group consisting of sodium and magnesium, followed by draining of molten by-product salt and aqueous leaching to remove residual soluble material the improvement which comprises, prior to leaching, heating the drained, crude titanium in particulate form in an inert atmosphere and out of contact with hot conductive-heating surfaces, to at least the boiling point of the by-product salt and below the melting point of titanium for a period of time sufficient to reduce the surface area of said metal to not greater than .05 square meter per gram, said period of time being less than ten minutes, and then cooling the titanium.

7. In the production of niobium metal involving a chemical reduction of a niobium chloride with a reducing metal selected from the group consisting of sodium and magnesium, followed by draining of molten by-product salt and aqueous leaching to remove residual soluble material the improvement which comprises, prior to leaching, heating the drained, crude niobium in particulate form in an inert atmosphere and out of contact with hot conductive-heating surfaces, to at least the boiling point of the by-product salt and below the melting point of niobium for a period of time sufficient to reduce the surface area of said metal to less than 0.1 square meter per gram, said period of time being less than ten minutes, and then cooling the niobium.

8. In the production of titanium metal involving a chemical reduction of a titanium chloride with a reducing metal selected from the group consisting of sodium and magnesium, in the presence of molten sodium chloride, followed by draining of molten salt and aqueous leaching to remove residual soluble material the improvement which comprises, prior to leaching, heating the drained, crude titanium in particulate form in an inert atmosphere and out of contact with hot conductive-heating surfaces, to at least the boiling point of the by-product salt and below the melting point of titanium for a period of time sufficient to reduce the surface area of said metal to not greater than .05 square meter per gram, said period of time being less than ten minutes, and then cooling the titanium and crushing the metal to an average particle size range from ½″ to 100 mesh.

9. In the production of niobium metal involving a chemical reduction of a niobium chloride with a reducing metal selected from the group consisting of sodium and magnesium, followed by draining of molten by-product salt and aqueous leaching to remove residual soluble material the improvement which comprises, prior to leaching, heating the drained, crude niobium in particulate form in an inert atmosphere and out of contact with hot conductive-heating surfaces, to at least the boiling point of the by-product salt and below the melting point of niobium for a period of time sufficient to reduce the surface area of said metal to less than 0.1 square meter per gram, said period of time being less than ten minutes, and then cooling the niobium and crushing the metal to an average particle size range from ½″ to 100 mesh.

References Cited in the file of this patent

UNITED STATES PATENTS

| | | |
|---|---|---|
| 2,290,338 | Koehring | July 21, 1942 |
| 2,355,954 | Cremer | Aug. 15, 1944 |
| 2,482,127 | Schelecten et al. | Sept. 20, 1949 |
| 2,773,760 | Winter | Dec. 11, 1956 |
| 2,778,726 | Winter et al. | Jan. 22, 1957 |

FOREIGN PATENTS

| | | |
|---|---|---|
| 717,930 | Great Britain | Nov. 3, 1954 |
| 720,517 | Great Britain | Dec. 22, 1954 |